(12) United States Patent
Gariador et al.

(10) Patent No.: US 7,685,420 B2
(45) Date of Patent: Mar. 23, 2010

(54) COOKIE-BASED MECHANISM PROVIDING LIGHTWEIGHT AUTHENTICATION OF LAYER-2 FRAMES

(75) Inventors: Frederic Gariador, Ottawa (CA); Jean-Marc Robert, Ottawa (CA)

(73) Assignee: Alcatel Lucent, Paris (FR)

( * ) Notice: Subject to any disclaimer, the term of this patent is extended or adjusted under 35 U.S.C. 154(b) by 1590 days.

(21) Appl. No.: 10/939,378

(22) Filed: Sep. 14, 2004

(65) Prior Publication Data

US 2006/0056402 A1    Mar. 16, 2006

(51) Int. Cl.
H04L 9/32 (2006.01)

(52) U.S. Cl. .......................... 713/168; 380/28; 380/44; 380/45; 235/454

(58) Field of Classification Search ................. 713/163, 713/183, 182, 153, 168; 726/6, 22, 3; 370/389; 380/270, 28, 44, 45; 455/410, 411; 235/454
See application file for complete search history.

(56) References Cited

U.S. PATENT DOCUMENTS 6,976,177 B2 * 12/2005 Ahonen .......................... 726/3
2005/0044224 A1 * 2/2005 Jun et al. ..................... 709/225

OTHER PUBLICATIONS

Bellardo, J., et al., 802.11 Denial-of-Service Attacks: Real Vulnerabilities and Practical Solutions, Dept. of Computer Science and Engineering, Univ. of California at San Diego.

Faria, Daniel B., et al., DoS and Authentication in Wireless Public Access Networks, Computer Science Dept., Stanford University, 2002.

Rivest, Ronald L., et al., PayWord and MicroMint: Two simple micropayment schemes, MIT Laboratory for Computer Science, Apr. 27, 2001.

* cited by examiner

*Primary Examiner*—Thanhnga B Truong
(74) *Attorney, Agent, or Firm*—Kramer & Amado, PC (57) ABSTRACT

Methods and apparatus for improving the resilience of wireless packet-switched networks to Layer-2 attacks is provided via a lightweight mechanism for detecting spoofed frames. The mechanism enables a receiving node to detect spoofed frames from information contained in cookies sent with frames. A first cookie, containing initial information, is sent to the receiving station from the transmitting node along with the first frame of a frame set. For each received frame, spoofing detection includes applying a function to information received via a corresponding cookie received with the subject frame, the result of which function is compared with information received via a previous cookie. The validity of the subject frame is asserted if the result of applying the function to information received in the corresponding subject cookie correlates with previous or initial information received in a previous or the first cookie, respectively. An exemplary implementation includes using a one-way hashing function. Advantages are derived from a low computational overhead in effecting spoofed frame detection and from an ability of the proposed solution to co-exist with other standardized security mechanisms.

17 Claims, 4 Drawing Sheets

COOKIE-BASED MECHANISM PROVIDING LIGHTWEIGHT AUTHENTICATION OF LAYER-2 FRAMES

FIELD OF THE INVENTION

The invention relates to wireless packet-switched communications, and in particular to methods of authenticating layer-2 frames in enhancing wireless communication security.

BACKGROUND OF THE INVENTION

Solutions to wireless networking security have been, and are being sought. Proposals for enhanced wireless networking security have been put forward and some have been implemented with various measures of success between which:

The state of the art in the field of wireless networking security includes an IEEE 802.11i standard. The IEEE 802.11i standard addresses wireless networking security issues. A subset of the IEEE 802.11i standard is also known as Wireless-LAN Protected Access (WPA).

The IEEE 802.11i standard greatly increases the security of an 802.11 wireless communication network providing an authentication method for protecting access to the network, as well providing sound cryptographic mechanisms to ensure privacy in conveying content such as Temporal Key Integrity Protocol (TKIP), and Advanced Encryption System (AES). Nevertheless, in accordance with the IEEE 802.11i standard, management and control frames are exchanged in an unauthenticated fashion which constitutes an exposure to various "man-in-the-middle" and "Denial-of-Service" (DoS) attacks.

The prior art includes a paper entitled "802.11 Denial-of-Service Attacks" published on the Internet at: http://ramp.ucsd.edu/~bellardo/pubs/usenix-sec03-80211dos-html/aio.html by John Bellardo and Stefan Savage. In the paper, Bellardo and Savage present a thorough analysis of Media Access Control (MAC) layer vulnerabilities including "man-in-the-middle" and "denial-of-service" attacks. In the paper it is demonstrated that attacks based on 802.11 vulnerabilities can be mounted feasibly and efficiently in real world wireless networking environments. Such attacks are efficient and can easily lead to a loss of availability and reliability of a wireless network. The paper also shows that the level of expertise required to mount such attacks is low, as the tools required are widely available without need for specialized equipment.

Another prior art attempt at improving wireless networking security includes a paper entitled "DoS and Authentication in Wireless Public Access Networks" published on the Internet at http://www.cse.cuhk.edu.hk/~xqli/ by Daniel B. Faria and David R. Cheriton who propose a new set of protocols addressing security issues that are not addressed in the IEEE 802.11i standard. However the solution proposed by Faria and Cheriton requires making substantial changes to current standards, and requires extensive computational resources due to an extensive reliance on cryptographic mechanisms.

Network operators seek to provide wireless networking services using IEEE 802.11 technologies to complement their existing offerings. Network operators are required to provide reliable communications services securely while adhering to existing standards and seek ways to do so with a minimal overhead.

There therefore is a need to solve the above mentioned security issues.

SUMMARY OF THE INVENTION

An object of the present invention is to address the above mentioned security issues.

In accordance with an aspect of the invention, methods and apparatus for improving the resilience of IEEE 802.11 networks to Layer-2 attacks is provided via a lightweight mechanism for detecting spoofed frames. The mechanism enables a receiving station to detect spoofed frames from information contained in cookies sent with valid frames. A first cookie, containing initial information, is sent to the receiving station from the transmitting station at the start of a session. For each received frame, spoofing detection includes applying a system-wide function to information received via a corresponding cookie received with the subject frame, the result of which function is compared with information received via a previous cookie. The validity of the subject frame is asserted if the result of applying the function to information received in the corresponding subject cookie correlates with previous or initial information received in a previous or the first cookie, respectively.

In accordance with another aspect of the invention, a method of conveying Layer-2 frames of a frame set used to provision packet-switched communications in a wireless communications network between a transmitting node and at least one of multitude of receiving nodes is provided. A commitment cookie value is transmitted along with a first frame in the frame set from the transmitter node towards the receiving node. The commitment cookie value is received at the receiving node along with the first frame. A corresponding unique message cookie value of a multitude of message cookie values generated sequentially by a repeated application of a generating function to a first seed value is transmitted along with each subsequent frame of the frame set. The sequence of message cookies includes the commitment cookie value. A message cookie value is received at the receiving node along with each subsequent received frame of the frame set. And, the authenticity of each subsequent received frame is asserted if a previously received cookie value can be derived from the message cookie value corresponding to the received frame.

In accordance with a further aspect of the invention, a method of authenticating a multitude of Layer-2 frames of a frame set used to provision broadcast communications in a packet-switched communications network between a transmitting node and a multitude of receiving nodes is provided. Transmitting frames to each receiving node includes: obtaining a first seed value; generating a unique sequence of message cookie values at the transmitting node by a repeated application of a generating function to the first seed value, the unique sequence of message cookie values including the commitment cookie value; and transmitting a unique message cookie value along with each transmitted frame of the frame set, the commitment cookie value being transmitted along with the first frame of the frame set, a unique subsequent message cookie value in the sequence of message cookie values being transmitted along with a subsequent frame in the frame set.

In accordance with yet another aspect of the invention, a method of verifying the authenticity of a multitude of Layer-2 frames of a frame set used to provision broadcast communications in a packet-switched communications network between a transmitting node and a multitude of receiving nodes is provided. Receiving frames at each receiving node includes: receiving a commitment cookie value along with a fist frame of the frame set; receiving a message cookie value along with each subsequent received frame of the frame set; and selectively asserting the authenticity of each subsequent received frame, if a previously received cookie value can be derived from the message cookie value corresponding to the received frame.

Advantages are derived from a low computational overhead in effecting spoofed frame detection and from an ability of the proposed solution to co-exist with other standardized security mechanisms.

BRIEF DESCRIPTION OF THE DRAWINGS

The features and advantages of the invention will become more apparent from the following detailed description of the exemplary embodiments with reference to the attached diagrams wherein.

It will be noted that in the attached diagrams like features bear similar labels.

DETAILED DESCRIPTION OF THE EMBODIMENTS

In the present description, a transmitting node is a wireless communications network node that transmits a frame, also known as a Protocol Data Unit (PDU), to a receiving node. The receiving node is a wireless communications network node that receives the frame. The receiving node verifies the authenticity of each received frame. In practice, each communications network node acts as a transmitting node and as a receiving node in providing bi-directional connectivity therebetween, wherein each bi-directional connection may be understood as a pair of interrelated reciprocal unidirectional connections. Wireless communications network nodes include wireless communications network node stations participating in "ad-hoc wireless networks" established therebetween, and service communications network nodes such an access points employed in implementing "wireless infrastructure networks" in which multiple wireless communications network node stations communicate with a wireless communications network access point. The invention described herein may also be applied to wireless repeater nodes which relay frames in a communications network.

In accordance with an exemplary embodiment of the invention, wireless network nodes are provided with detection means for identifying spoofed Layer-2 frames. Cookies produced by transmitting nodes and sent along with corresponding protected frames in order to provide receiving nodes with the means to verify that the frames have been sent by the expected transmitting nodes.

Accordingly a lightweight (not resource intensive) cookie-based method is proposed for mitigating MAC frame spoofing attacks such as, but not limited to, man-in-the-middle and denial-of-service attacks. The method enables a receiving network node to detect and reject frame encapsulated messages spoofed with the physical address (MAC) of a different transmitting network node than the transmitting node the receiving network node had been previously communicating with. As a result, an attacker is prevented from impersonating trusted network nodes by forging MAC/Layer-2 frames.

In accordance with an exemplary embodiment of the invention, two types of cookies are proposed for use: a Commitment Cookie (CC) and a Message Cookie (MC). Cookies are understood to be an integral amount of information generated, stored, and optionally conveyed in a communications network, the cookie information being specific to a particular application. In the present description, the application is the protection of Layer-2 frames, wherein the cookie information may include as little as a single value without limiting the invention thereto. For this reason the terms "cookie" and "cookie value" may be used interchangeably herein.

Each CC cookie is generated by a transmitting node at the initiation of connection establishment with a counterpart receiving node, and typically sent along with the first transmitted frame. In order to provide adequate/desired security/protection, the CC cookie and/or the CC value is selected to be valid only for the given receiving node, and may further be chosen to be valid only for a specific connection. Implementations of methods presented herein may be applied to any set of frames which is to be protected including, but not limited to: data, control, management frame sets.

Each MC cookie is generated by the transmitting node, sent to the receiving node along with a corresponding subsequent frame in the frame set to be protected, and can be verified by the receiving node using the corresponding CC cookie. Each MC cookie is generated and used only once in conveying an associated frame between the transmitting node and the receiving node. Should a frame in the frame set require retransmission, a different unique MC cookie is associated with each retransmitted frame.

In accordance with the exemplary embodiment of the invention, the receiving node includes authenticity validation means for validating whether each MC cookie has been generated by the expected transmitting node having regard to the previously received CC cookie. Failure to validate the authenticity of an MC cookie is understood to indicate that the corresponding frame has not been sent by the expected transmitting node pointing to an attempt to forge/spoof frames.

In accordance the exemplary embodiment of the invention, MC cookies are generated in such a way that disclosing the CC cookie and an arbitrary set of MC cookies does not allow one to easily predict the next valid MC cookie. MC cookies are generated in sequences which include the CC cookie.

A related prior art paper entitled "Two Simple Micropayment Schemes" published on the Internet at http://theory.lcs.mit.edu/~rivest/RivestShamir-mpay.pdf by Ronald L. Rivest and Adi Shamir, incorporated herein by reference, describes examples of usage of hash chains to provide security in micropayment schemes. This is an example of a mechanism providing security at a low computational cost, and similar techniques have been applied for online auction, authentication schemes, etc. However, to date, such mechanisms are not known to have been applied to authenticate IEEE 802 Layer-2 frames as proposed herein.

In accordance with an exemplary implementation of the exemplary embodiment of the invention, properties of exemplary one-way hashing functions such as, but not limited to:

SHA-1 or MD5, are employed in generating unique hash chains used in generating CC and MC cookies used for protecting transmitted frames in order to improve security of packet-switched wireless communications. The choice of the one-way hashing function employed relates to a balance between computational complexity and the level of security provided. Each network node may include computing means, typically in the form of hardware logic, for efficiently computing a group of one-way hashing functions. The selection of the one-way hashing function used may be configurable on the equipment or may be negotiated between transmitting nodes and receiving nodes.

Figure 1:
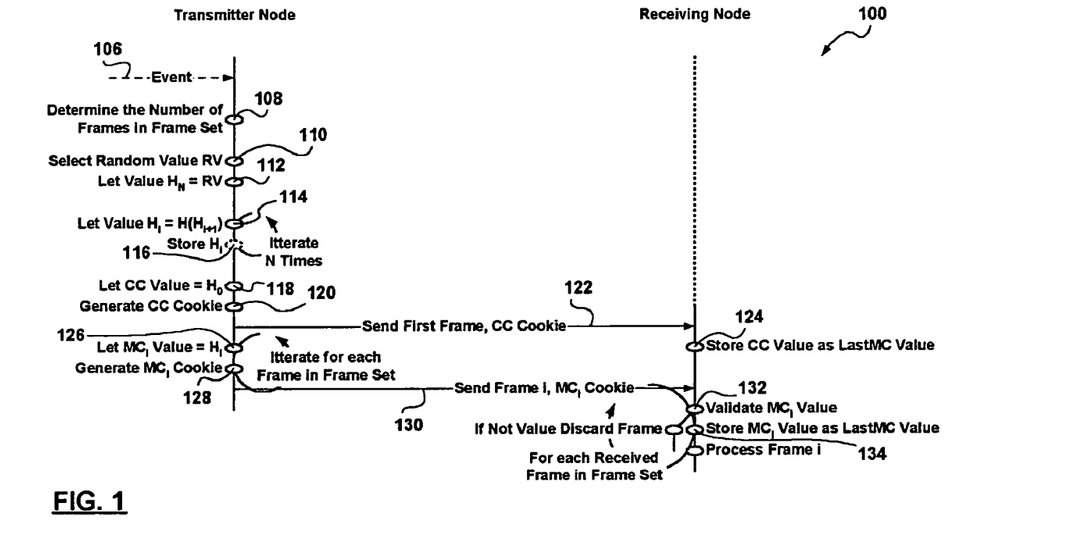
FIG. 1 is a schematic diagram showing, in accordance with an exemplary implementation of an exemplary embodiment of the invention, method steps implementing secure exchange of messages between a transmitting network node and a receiving network node.

In accordance with the exemplary embodiment of the invention, exemplary method steps 100 are shown in FIG. 1. For each (data, control, management) set of frames 106 to be protected, the transmitting node performs initialization steps including:

Let N be the maximum number of message cookies MC to be associated to a given commitment cookie CC cookie, and therefore, the maximum number of frames that can be protected based on the CC cookie. The value of N is chosen 108 by the transmitting node;

Select 110 a seed value, typically a Random Value (RV) generated by a random value generator;

(step 112) Let $H_N$ equal the seed value RV;

(step 114) Iterate N times $H_i=H(H_{i+1})$, for each i between $0 \leq i \leq N$ using the computing means;

(optionally) Store 116 each $H_i$; and

Let 118 the cookie value $CC=H_0$, where determining the number of frames to be exchanged and determining the number N of function iterations needed may be performed via a lookup table depending on the set of frames to be protected. For example, in protecting connection control messages, both connection setup messages and tear down messages are to be accounted for. The expected number of frames N to be exchanged may account for frame retransmissions providing a fraction of spares.

The transmitting node generates 120 the CC cookie and sends 122 the initial CC cookie, and therefore the CC value, to the receiving node along with the first frame of the frame set to be protected.

The receiving node receives 122 the initial frame and the CC cookie, and stores 124 the CC value, in this case $H_0$.

For each subsequent frame sent by the transmitting node, the transmitting node generates 128 an $MC_i$ cookie for authenticating the a corresponding frame in the frame set, such that $0 < i \leq N$, by setting 126 the value of $MC_i = H_i$ and incrementing i before sending 130 each subsequent frame. If no frame retransmissions are necessary, cookie value $MC_i$ would correspond to the i'th frame of the frame set.

The receiving node validates 132 the authenticity of each MC cookie received with a corresponding frame thereby verifying that the frame has been sent by the expected transmitting node. A LastMC register is initialized (124) with the CC value upon reception 122 of the CC cookie. The following pseudo code shows exemplary steps of a received MC cookie authentication verification process (132). The principle is that applying the same one-way hashing function H to a received correct MC cookie value would result to a previously received MC cookie value or the initial CC cookie value:

```
TempMC = MC;
Verification = false;
For x = 1 to T {
    TempMC = H(TempMC)
    If (TempMC == LastMC) {
        LastMC = MC
        Verification = True
        Break the loop
    }
}
if (Verification == True){Accept_Frame( )}
else {Reject_Frame( )}
``` where the value T is used to provide tolerance to a possible loss of synchronization between the transmitting and receiving nodes that may otherwise lead to an inconsistent LastMC value. Note that once the frame is validated, the LastMC value is updated 134 with the newly validated MC value ensuring that the previous MC value in the hash chain would be rejected if received again.

Note that in accordance with the exemplary implementation described above, all hash chain values $H_i$ have to be computed 114 and stored 116 at the transmitting node as the cookie values are used in a reverse order than the order in which the cookie value were generated. Depending on the set of frames to be protected and the number of concurrent sessions supported by transmitting node, a significant amount of storage may be required at the transmitting node. In accordance with an exemplary implementation, in order to reduce the storage requirements needed at the transmitting node, storing 116 only every $10^{th}$ $H_i$ value, the storage space required may be reduced by a factor of 10. However, the transmitting node must iterate 114 on average 4.5 times to compute any given $H_i$ value.

Figure 2:
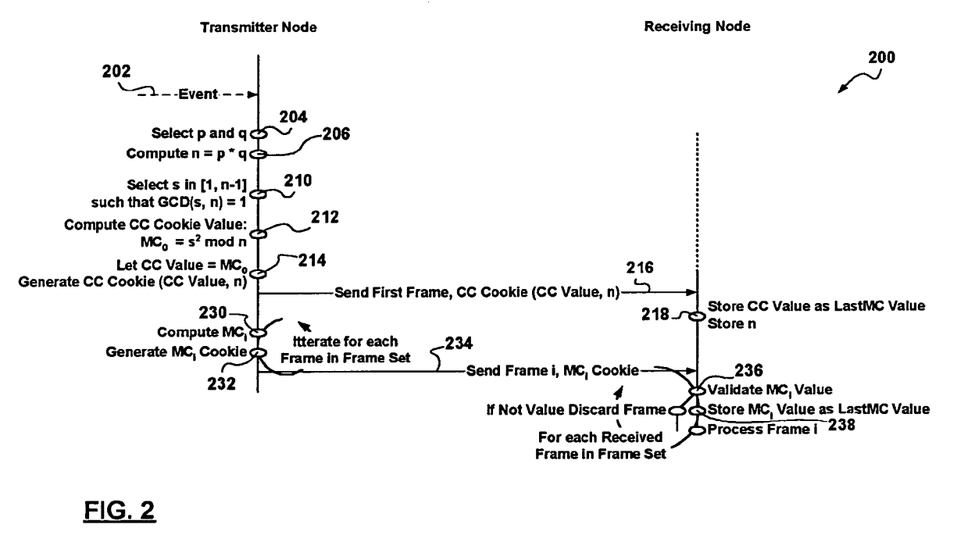
FIG. 2 is a schematic diagram showing, in accordance with another exemplary implementation of the exemplary embodiment of the invention, method steps implementing secure exchange of messages between a transmitting network node and a receiving network node.

In accordance with another exemplary implementation of the exemplary embodiment of the invention, an exemplary method of generating CC and MC cookies which does not require MC cookie values to be computed in advance, nor stored, is presented. The method is based on a well known computationally intractable problem in number theory which relates to functions which are infeasible to invert. Exemplary method steps 200 shown in FIG. 2 and are performed by the transmitting node in authenticating a (data, control, management) frame set 202 to be protected, the initialization steps including:

Selecting 204 two distinct large prime numbers p and q, such that $p \equiv q \equiv 3 \mod 4$;

(step 206) Setting n=p*q, such a number n is known as a Blum-integer;

(step 210) Selecting s, a random number in the range [1, n−1], such that s and n are relatively prime (i.e. GCD(s, n)=1, where GCD stands for Greatest Common Divisor);

Computing 212 the CC cookie value: $MC_0 = s^2 \mod n$ using computing means at the transmitting node; and In generating 214 the CC cookie, letting $CC=(MC_0, n)$.

The CC cookie, including both $MC_0$, and n values, is sent 216 to the receiving node along with the first transmitted frame in the protected frame set. The receiving node stores 218 the CC cookie including both $MC_0$, and n values. Note that value s is only known to the transmitting node.

For generating 232 each subsequent $MC_i$ cookie in the chain, to send 234 along with a subsequent protected frame, where i is the sequence number of the frame to be authenticated such that $i \geq 1$, the transmitting node computes 230 the $MC_i$ value to be the quadratic residue of $\sqrt{MC_{i-1}} \mod n$, which has the property of being a quadratic residue itself. For each Blum-integer n, this function is uniquely defined. The entire chain of MC cookie values is unique based on the CC cookie value, for this reason the CC cookie value is also known as a seed value.

The $MC_i$ cookie is sent 234 to the receiving node along with a corresponding frame to be protected. The value i is incremented before sending each subsequent message.

Security is achieved as calculating the quadratic residue is computationally feasible only when p, q and s are known and as the transmitting node is the only node knowing the p, q and s values. It would be computationally infeasible for another rogue transmitting node to generate $MC_i$ cookie values despite the fact that the CC cookie value and n were essentially published via the first frame transmission.

The receiving node validates 236 the authenticity of each MC cookie received along with a corresponding frame verifying that the frame has been sent by the expected transmitting node.

The following pseudo code shows exemplary steps of a received MC cookie authentication verification process 236. A LastMC register is initialized (218) to the $MC_0$ value upon receiving 216 of the CC=($MC_0$, n) cookie. The principle is that applying the inverse of the generating function, the square function modulo n to a correct received MC value would result to a previously received cookie value:

```
TempMC = MC;
Verification = false;
For x = 1 to T {
    TempMC = TempMC² mod n
    If (TempMC == LastMC) {
        LastMC = MC
        Verification = True
        Break the loop
    }
}
if (Verification == True){Accept_Frame( )}
else {Reject_Frame( )},
``` where the T value provides tolerance to a possible loss of synchronization between the transmitting and receiving node that may lead to an inconsistent LastMC value. Note that once the authenticity of the frame is validated, the LastMC value is updated 238 with the newly validated MC value ensuring that the previous MC value in the sequence would be rejected if received again.

It is noted that in accordance with the exemplary implementation described above, besides the advantage of not requiring MC cookie values to be precomputed, no restriction is imposed on the number of messages of the protected frame set.

Implementations are envisioned wherein both exemplary methods 100 and 200 described above are employed. For example, the first method 100, specifically taking advantage of the fact that a specific number of valid hash values $H_i$ are computed in advance, is used in respect of control/management frames specifically as a known number of such frames are transmitted between a transmitting node and a receiving node, while the second method 200 may be used to protect data frames transmitted between the transmitting node and receiving node in respect of an established connection which persists for an unknown extended duration.

In accordance with the exemplary implementation of the above described exemplary embodiment of the invention, the transmitting node is the only node able to generate valid MC cookies efficiently. Knowing the initial CC cookie value and/or previously sent MC cookie values, does not allow rogue nodes other than the legitimate transmitting node to easily generate subsequent valid MC cookie values, while knowing the CC cookie value or a previously sent MC cookie value, the receiving node is able to verify that subsequent MC cookie values received along with corresponding frames are authentic, and as a consequence, generated by the expected transmitting node.

While two exemplary methods have been presented above in respect of the exemplary embodiment of the invention, the invention is not limited to the two methods presented above, as any other methods that fulfill the same above stated properties could be employed.

Figure 4:
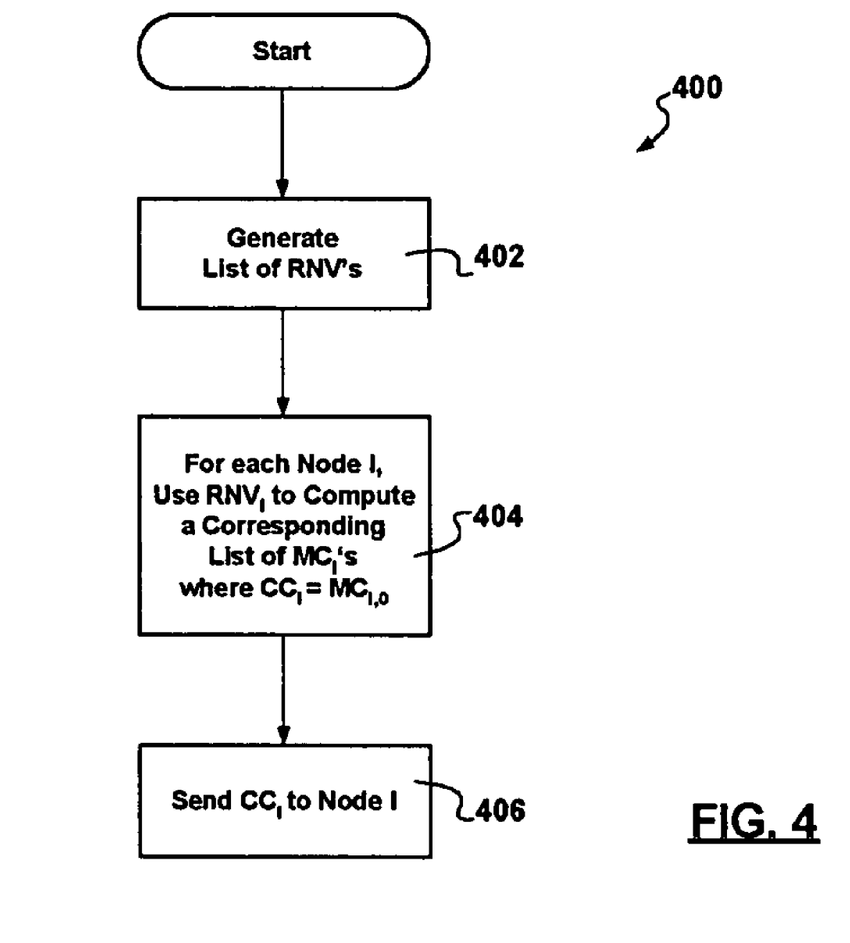
FIG. 4 is a schematic diagram showing, in accordance with another exemplary embodiment of the invention, method steps implementing secure exchange of messages between a transmitting network node and a multitude of receiving network nodes.

In accordance with a second exemplary embodiment of the invention, frame validation is provided in support of unicast and/or broadcast scenarios/deployments typically suited for an access point transmitting node used to broadcast frames in a wireless infrastructure network. FIG. 4 shows steps of an exemplary method steps 400 performed by a transmitting node (access point) including:

Computing 402 receiving node specific seed values $RNV_1$, $RNV_2$, $RNV_3$, . . . such that if $RNV_J$ is published, any receiving node (network node station) can compute values $RNV_I$, for I<J.

Using one of the $RNV_I$ values at the transmitting node as a random seed value in generating 404 a unique list of P cookies ($MC_{I,0}$, $MC_{I,1}$, . . . , $MC_{I,P+1}$) for the receiving node I.

In initiating exchange of frames of a frame set (data, control, management), the transmitting node sends 406 the $MC_{I,0}$ value in a commitment cookie $CC_I$ to the corresponding receiving node I.

In authenticating a single frame for the receiving node I, the transmitting node proceeds in accordance with one of the frame authentication method 100 and the frame authentication method 200 described herein above using the appropriate MC cookie list for the receiving node I.

The receiving node I can validate the authenticity of each MC cookie by deriving the corresponding a previously received MC cookie or the commitment cookie $CC_I$.

If the transmitting node wants to authenticate a unique broadcast message intended for and transmitted to all receiving nodes I such that I<J, the transmitting node uses the cookie $RNV_J$ as the seed value, each receiving node I then being able to retrieve the corresponding commitment cookie $CC_I$ from the respective value $RNV_I$. Broadcast frames are flagged as such.

In order to use the broadcast frame authentication method, the transmitting node needs to:

Build 402 the main list of RNV's; and

Figure 3:
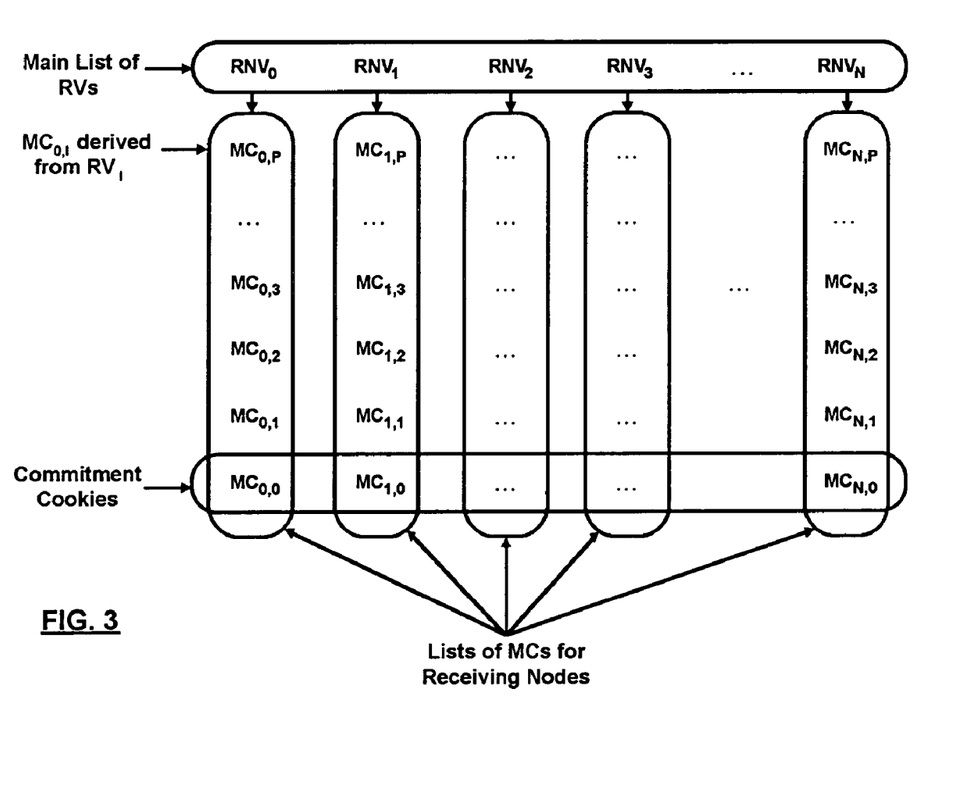
FIG. 3 provides an overview of exemplary relationships between cookie values employed in authenticating broadcast frames, in accordance with the exemplary embodiment of the invention.

Compute 404 the list of message cookies $MC_I$ and the corresponding commitment cookie $CC_I$ for each receiving node I. FIG. 3 provides an overview of the relationships between cookie values.

Two exemplary methods for performing the above task 402 are presented herein below, the methods being loosely derived from the frame authentication methods 100 and 200 presented in respect of the first exemplary embodiment. The list of methods presented herein is not exhaustive as any methods that fulfill the same properties could also be used. A combination of methods can be used to achieve implementation tradeoffs:

In accordance with an exemplary implementation of the second exemplary embodiment of the invention, where building 402 the main list of RVs includes computing a one-way hash chain, where H is a one-way hashing function, the hash chain being generated as follows:

$RNV_N$=random seed value $RNV_i=H(RNV_{i+1})$ for $0 \leq i < N$ where N relates to the number of receiving nodes supported.

In accordance with another exemplary implementation of the second exemplary embodiment of the invention, a method used to build 402 the list of RNVs which does not require RNVs to be computed in advance and includes:

The transmitting node selecting two distinct large prime numbers such that $p \equiv q \equiv 3 \mod 4$;

Letting $n=p*q$, such a number n is known as a Blum-integer;

Selecting a random number s in $[1, n-1]$ such as the GCD $(s, n)=1$

Using computing means compute $RNV_0=s^2 \mod n$; and

Computing $RNV_i=\sqrt{RV_{i-1}} \mod n$ which is a unique quadratic residue.

Notice there is no limitation on the number of receiving nodes supported.

In transmitting frames, message cookies $MC_{I,J}$ are computed 404 for each receiving node:

In accordance with an exemplary implementation of the second embodiment of the invention, the method of generating 404 a list of receiving node specific message cookies $MC_{I,J}$ includes computing hash value chains:

Let G be a one-way hashing function known to the transmitting node and all receiving nodes I, the chain of cookie values for receiving node I is generated by:

$MC_{I,P+1}=RNV_I$ which was generated specifically for receiving node $I$ $MC_{I,J}=G(MC_{I,J+1})$ for $0 \leq J \leq P$ $CC_I=MC_{I,0}$ where, $CC_I$ value is transmitted in the commitment cookie $CC_I$ to the receiving node I. Then, the list of the P successive cookies is given by $MC_{I,1}, MC_{I,2}, \ldots, MC_{I,P}$.

When the receiving node I receives the cookie $MC_{I,J}$ along with a frame, the receiving node I can validate the cookie by applying G to value $MC_{I,J}$ and determining if the result corresponds to a previous valid cookie $MC_{I,K}$ for K<J or the commitment cookie $CC_I$.

On the other hand, if a receiving node L, for L<I, receives the cookie $RNV_I$, the receiving node L can verify the cookie by determining if the corresponding commitment cookie $CC_L$ or any other authenticated cookie $MC_{L,K}$ for K>0 can be derived from the cookie $RNV_I$.

In accordance with another exemplary implementation of the second embodiment of the invention, an method of generating 404 message cookies $MC_{I,J}$ is used which does not require $MC_{I,J}$'s to be stored as follows:

$MC_{I,P+1}=RNV_I$ $MC_{I,J}=RNV_I^{2^{(P-J+1)}} \mod n_I$ for $0 \leq J \leq P$ where $n_I$ is the product of two distinct prime numbers $p_I \equiv q_I \equiv 3 \mod 4$ chosen randomly by the transmitting node, and where the commitment cookie $CC_I$ for the receiving node I includes values $n_I$ and $M_{I,0}$. A receiving node specific random number $s_I$ in $[1, n_I-1]$ such as the GCD $(s_I, n_I)=1$ is employed by the transmitting node in the computation.

When the receiving node I receives cookie $MC_{I,J}$, in validating the $MC_{I,J}$ cookie, the receiving node I employs computation means to determine if a previously validated cookie $MC_{I,K}$ for K<J, or the value $M_{I,0}$ of the commitment cookie $CC_I$ can be derived by repetitively squaring $MC_{I,J}$ modulo $n_I$ as described herein above.

On the other hand, if a receiving node L, for L<I, receives the cookie $RNV_I$ with a broadcast message frame, the receiving node verifies the authentication of the cookie by determining if the commitment cookie $CC_L$ or any other authenticated cookie $MC_{L,K}$ for K>0, can be derived from the $RNV_I$ value. This can be done by first deriving $RNV_L$ from $RNV_I$, and then deriving $CC_L$ (or $MC_{L,K}$) from $RNV_L$.

It is pointed out that, in accordance with the above described methods, once a communication session has been established, and hence a CC cookie has been sent to the receiving node, subsequent protected messages cannot be spoofed by an attacker. Methods of authenticating the transmitting node, described elsewhere, are employed to separate valid transmitting nodes from rogue transmitting nodes.

It is understood, although not shown, that each value tracked by the transmitting node and/or the receiving node may be stored in a corresponding register at the transmitting node and/or the receiving node respectively. Mention was made to computing means both at the transmitting node and the receiving node, computing means which is understood to include logic for carrying out needed computations.

The above proposed solutions therefore incur only a relatively low computational overhead avoiding reliance on arithmetic processor consuming operations that could lead to an inability for the subject network nodes to operate normally reducing exposure to other forms of denial-of-service attacks based on arithmetic processor exhaustion.

The above proposed solutions therefore do not incur a management overhead as there are no requirements for the installation and the management of cryptographic key material on the participating network nodes and therefore no dependence on a Public Key Infrastructure.

The above proposed solutions therefore does not replace other security mechanisms including proposed IEEE 802.11i and IEEE 802.1x mechanisms, but rather complement existing mechanisms in order to fill identified Layer-2 security gaps enabling deployment of implementations of the proposed solution along existing technologies.

While the invention has been described making reference to the IEEE 802.11 wireless standard, the invention is not limited thereto, being equally applicable to other wireless networking protocols such as exemplary described in the IEEE 802.15, IEEE 802.16, and IEEE 802.20, all of which are incorporated herein by reference.

Advantageously the proposed solution increases the resilience of wireless packet-switched networks to Layer-2 attacks and hence contributes to improve the reliability and availability of such wireless networks without requiring changes to existing standards.

While the invention has been described making reference to exemplary wireless communications networks and network elements, such reference is not intended to limit the invention thereto, as the solutions described herein may be implemented in respect of wired communications networks and wired network elements.

The embodiments presented are exemplary only and persons skilled in the art would appreciate that variations to the above described embodiments may be made without departing from the spirit of the invention. The scope of the invention is solely defined by the appended claims.

We claim:

1. A method of authenticating a plurality of Layer-2 frames of a frame set used to provision broadcast communications in a packet-switched communications network between a transmitting node and a plurality of receiving nodes, the method comprising:
   obtaining a first seed value and a Blum-integer n that is relatively prime to the first seed value, the first seed value being known only to the transmitting node;
   generating a sequence of message cookie values at the transmitting node by a repeated application of a generating function to the first seed value using the Blum-integer, the generating function being infeasible to invert, the sequence of message cookie values uniquely based upon a commitment cookie value;
   transmitting the unique sequence of message cookie values along with respective frames of the frame set to each of said receiving nodes, the commitment cookie value being transmitted along with a first frame of the frame set; and
   setting the first seed value to a receiving node associated value generated uniquely by the transmitting node by applying one of a one-way hashing function to a second seed value, and a computationally intensive function.

2. The method claimed in claim 1, further comprising:
   transmitting a unique message cookie value along with each retransmitted frame.

3. The method claimed in claim 1, the method further comprising:
   setting the second seed value to a random value known only by the transmitting node.

4. The method claimed in claim 1, the method further comprising:
   selecting an integer N having a value greater than or equal to a number of frames in the frame set, and corresponding to a total number of message cookie values in the sequence of message cookie values;
   setting a last message cookie value to the first seed value; and
   computing each message cookie value in the sequence of message cookie values by repeated application of a one-way hashing function to an existing cookie value, the commitment cookie value being an Nth cookie value generated by an Nth application of the one-way hashing function to the first seed value.

5. The method claimed in claim 4, further comprising:
   storing at least the first seed value for generating cookie values corresponding to all frames in the frame set.

6. The method claimed in claim 4, further comprising:
   storing at least a subsequence of cookie values for generating remaining message cookie values corresponding to frames in the frame set.

7. The method claimed in claim 1, the method further comprising:
   selecting p and q from a plurality of prime integers, such that p and q are congruent to 3 mod 4;
   computing the Blum-integer n from a product of p and q; and
   selecting an integer s in a range [1, n−1], such that s and n are relatively prime.

8. The method claimed in claim 7, further comprising:
   transmitting to the receiving node the commitment cookie value and the Blum-integer n along with the first frame, while p, q, and s remain known only by the transmitting node.

9. The method claimed in claim 7, the method further comprising:
   computing a quadratic residue given by a modulus n of a square root of one of the commitment cookie values, and one of the previous message cookie values, the quadratic residue being easily computable by the transmitting node knowing p, q, and s, otherwise the quadratic residue being infeasible to compute.

10. The method claimed in claim 1, further comprising:
    selecting the generating function from a group of generating functions computable by the transmitting node.

11. The method claimed in claim 10, the method further comprising:
    negotiating use of the generating function based on generating function sets respectively computable by the transmitting node and the receiving node.

12. The method claimed in claim 10, the method further comprising:
    selecting a one-way hashing function from one of an MD5 hashing function and an SHA-1 hashing function.

13. A method of verifying the authenticity of a plurality of Layer-2 frames of a frame set used to provision broadcast communications in a packet-switched communications network between a transmitting node and a plurality of receiving nodes, the method comprising:
    receiving a commitment cookie value including a Blum integer n along with a first frame of the frame set at each of said receiving nodes;
    receiving a message cookie value along with each subsequent received frame of the frame set;
    verifying authenticity of each subsequent received frame by computing a modulus n of a square of the message cookie value so that a previously received cookie value can be derived from the message cookie value corresponding to a received frame; and
    applying to the message cookie value two of a one-way hashing function and a function having a computationally intensive inverse function.

14. The method claimed in claim 13, wherein the one-way hashing function is one of an SHA-1 hashing function and an MD5 hashing function.

15. The method claimed in claim 13, further comprising:
    storing the received commitment cookie value at the receiving node in a last valid cookie value register; and
    updating the last valid cookie value register with a newly validated message cookie value received along with a corresponding frame when the cookie value stored in the last valid cookie value register can be derived from the message cookie value.

16. The method claimed in claim 15, further comprising:
    discarding the subsequent received frame when the corresponding message cookie value equals the value held in the last valid cookie value register.

17. The method claimed in claim 15, the method further comprising:
    repeatedly and sequentially applying to the message cookie value, for a predetermined number of sequential repeated applications, both a one-way hashing function and a function having a computationally intensive inverse function.

* * * * *

UNITED STATES PATENT AND TRADEMARK OFFICE
CERTIFICATE OF CORRECTION

PATENT NO. : 7,685,420 B2 Page 1 of 1
APPLICATION NO. : 10/939378
DATED : March 23, 2010
INVENTOR(S) : Frederic Gariador and Jean-Marc Robert It is certified that error appears in the above-identified patent and that said Letters Patent is hereby corrected as shown below:

Column 11, Claim 7, line 7, please delete "[1, n-1]".

Signed and Sealed this

Eleventh Day of May, 2010

David J. Kappos
*Director of the United States Patent and Trademark Office*